United States Patent [19]
Mattson et al.

[11] 3,802,232
[45] Apr. 9, 1974

[54] BICYCLE LOCKING STAND

[75] Inventors: Jerry L. Mattson, Prior Lake; Dean O. Herman, II, Minneapolis, both of Minn.

[73] Assignee: Echelon Corporation, Minneapolis, Minn.

[22] Filed: Mar. 15, 1973

[21] Appl. No.: 341,748

[52] U.S. Cl.................... 70/234, 194/40, 224/29 R
[51] Int. Cl........................ E05b 71/00, B62h 3/10
[58] Field of Search........... 70/233, 234, 235; 211/5

[56] References Cited
UNITED STATES PATENTS

| | | | |
|---|---|---|---|
| 617,693 | 1/1899 | Shultz | 194/40 |
| 3,739,609 | 6/1973 | Kaufmann | 70/234 |
| 3,749,295 | 7/1973 | Palmer | 224/29 R |

FOREIGN PATENTS OR APPLICATIONS

| | | | |
|---|---|---|---|
| 183,435 | 3/1907 | Germany | 70/234 |

*Primary Examiner*—Albert G. Craig, Jr.

[57] ABSTRACT

A bicycle includes a down tube extending diagonally from a steering head above the yoke which supports the front wheel to a bottom bracket which supports the pedal crank shaft. A bicycle locking rack includes a locking box fixedly mounted in position where the bicycle can be parked with a central portion of the down tube immediately adjacent the locking box. A pair of parallel down tube retaining bars are integral with and extend outwardly from the box in position to encompass the bicycle down tube when the bicycle is so parked. A key operated locking mechanism within the box permits a J-shaped bike locking bar to be slideably mounted with respect to the box for movement between a closed condition where the shorter end of the J-Bar extends through openings provided in each of the retaining bars to be in an encompassing, locked relationship to a bicycle down tube situated between the retaining bars, and an opening of only one of said retaining bars and is in clearing relation to the opening between the retaining bars and the down tube situated there between.

6 Claims, 6 Drawing Figures

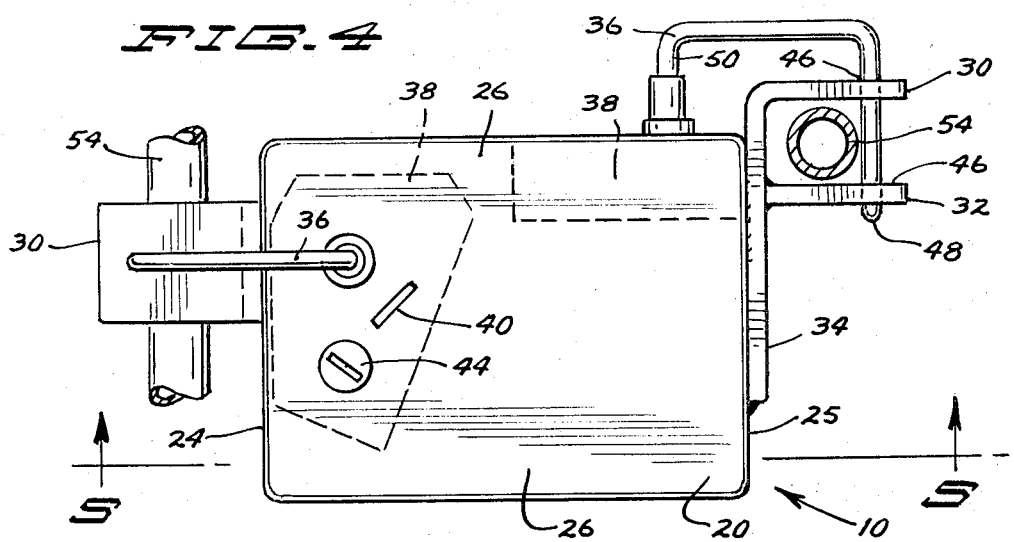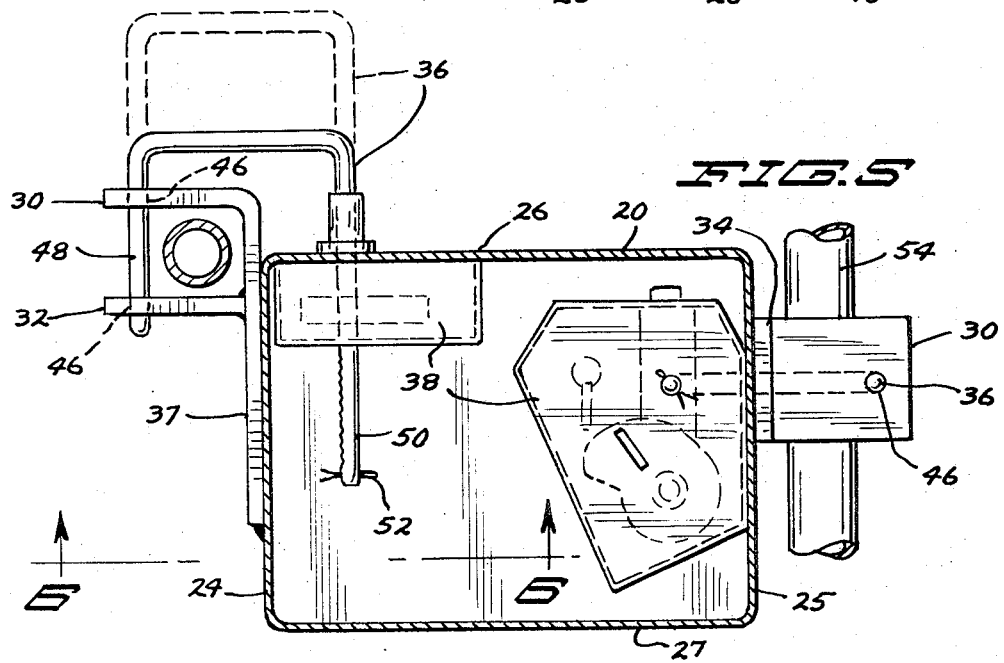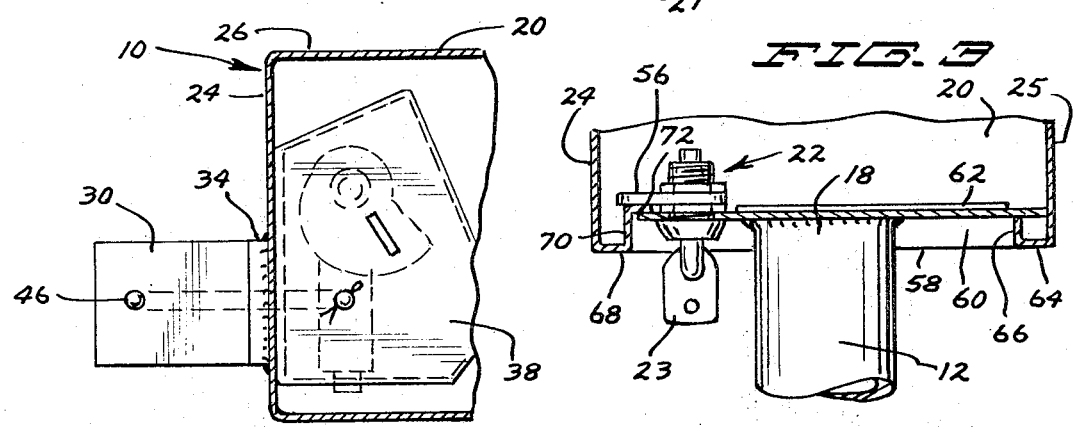

BICYCLE LOCKING STAND

BACKGROUND OF THE INVENTION

Theft of bicycles is and has been for years a very major economic problem. For many years the recognized "solution" to this problem was for the cyclist to carry a bicycle lock having an elongated U-shaped hasp, and for this hasp to be passed across the yoke supporting the front or the back wheel and through the wheel spokes thus to immobilize the bicycle when not in use. This remedy is effective in preventing others from simply jumping on the bicycle and riding it away.

To prevent bicycles from being picked up and loaded into trucks or other conveyances for movement to places where such bicycle locks can be destroyed with bolt cutters or the like, cyclists have resorted to chains which can be used to lock bicycles to each other and/or to trees or poles, or other relatively permanent topographic features. The proverbial weakness of a chain being determined by its links, such locking devices can readily be disabled by the use of bolt cutters, which are virtually silent and unnoticed in their operation, during darkness or when the bicycles are left in an unattended location.

Racks for parking or storing bicycles and including parallel, spaced apart front wheel supporting bars extending at a 45° angle are quite prevalent, and are entirely satisfactory at locations where constant supervision of the bicycles prevents a danger of theft. Such racks have been successfully utilized to lock bicycles as well, either by using a traditional bicycle lock as mentioned above, by using chains run through the front wheels on the side of the parallel wheel supporting bars opposite the remainder of the bicycle, or in other ways fixedly positioning the front wheels with respect to the bicycle rack. Such bicycles can be easily stolen, however, by undoing the bolts which fasten the front wheels to the front wheel yokes, abandoning the front wheels, and carrying off the remainder of the bicycle.

Locking racks have been proposed which include parallel bars which are fixedly mounted with respect to the ground, but which are positioned above the ground to encompass both of the yoke bars extending rearwardly from the bottom bracket to the rear wheel axle. These bars are designed to pass through the spokes of the rear wheel, and padlocks or the like can be used to prevent withdrawal of the bicycle from this association with the bars.

A difficulty with the foregoing structure is that it affords no support for the front end of the bicycle, and, therefore, the bicycle will almost immediately twist and fall from upright position thus at least scratching the yoke, if not bending or misaligning some of the spokes. Therefore, such structures have been augmented by providing separate parallel plates for supporting the front wheels simultaneously with the locking of the rear bottom yoke. Such structures suffer from the disadvantage of being extremely costly if they are made of materials thick enough so they cannot be destroyed easily and from the problem of taking up excessive space when not in use. Also, by their nature, they are very easily damaged either accidentally or purposefully by vandals wanting them disabled so that bicycles will have to be stored without their use.

Other schemes for locking onto structural or non-structural members of the bicycle have encountered the difficulty that the thieves are prepared to destroy such members in order to get away with the rest of the bicycle. The stolen parts are then stripped, and pooled with other stolen parts to form complete bikes.

BRIEF SUMMARY OF THE INVENTION:

This invention has relation to bicycle locking stands where a locking box or similar structure is ruggedly, firmly and fixedly attached to a pedestal or other appropriate structure to allow a main structural member of the main frame of a bicycle to be positioned against it. In the disclosure as shown, the down tube of the bicycle frame is locked adjacent the locking box, but other convenient and essential structural members of the main frame, such as the seat tube extending from the seat to the bottom bracket, could also be used.

The locking box has extending outwardly from it, rugged, spaced apart retaining bars situated to encompass the bicycle frame member, the down tube as shown; and a J-shaped locking bar extends from locking mechanism inside of the box to position through openings provided in the parallel retaining bars. This J-bar is slideable with respect to the rest of the stand so that the outer shorter end of it can move into and out of closing relationship with the ends of the retaining bars to selectively lock or release the down tube situated between the bars.

A key insertable into a lock in the locking box and mechanism is operative to selectively render the J-bar immovable and movable. In installations where the locking mechanism is coin operated in order to enable key operation, the coins are placed in the locking mechanism through the wall of the box, and are deposited inside of the box when they have performed their function.

A novel arrangement of the locking box with an upper pedestal plate situated on top of the pedestal, as shown, is controlled by a further key and lock installed in such a manner as to discourage or virtually eliminate opportunity for prying action to remove the box from the plate. When this pedestal plate lock is unlocked, the box can be removed from the pedestal plate for servicing of the locking mechanism or for removal of the coins.

In the drawings:

FIG. 3 is a vertical sectional view taken on the line 3—3 in FIG. 2;

FIG. 4 is an elevational view on the line 4—4 in FIG. 2, and showing portions of the down tubes of two separate bicycle frames as they would be related to the stand in its locked condition;

FIG. 5 is a sectional view taken on the line 5—5 in FIGS. 2 and 4; and

FIG. 6 is a fragmentary vertical sectional view taken on the line 6—6 in FIG. 5.

DESCRIPTION OF PREFERRED EMBODIMENT

Figure 1:
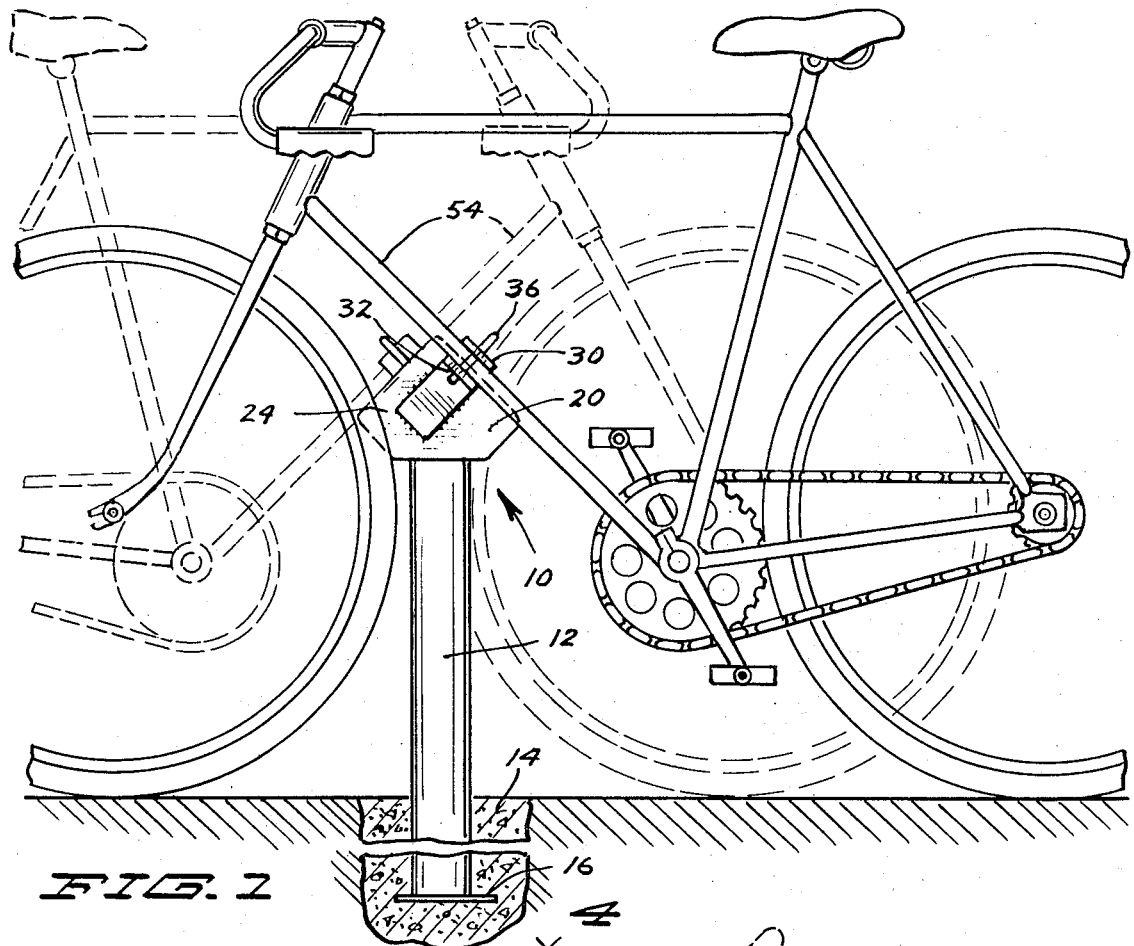
FIG. 1 is an elevational view of a bicycle locking stand of the invention showing a bicycle locked therein, and showing in dotted lines the positioning of a second bicycle which could be locked on the same stand at the other side thereof.

As shown, a bicycle locking stand, generally indicated at 10, includes a pedestal 12 permanently mounted in cement 14 and having a bottom pedestal plate 16 welded thereto and also set in the cement. Also welded to the pedestal is a horizontal upper pedestal plate 18.

Also forming a part of the bicycle locking stand 10 is locking box 20 which has an open bottom designed to be supported on upper horizontal pedestal plate 18 in such a manner that the bottom of the box is sealed closed and the box cannot be removed from the upper pedestal plate until a box lock mechanism, indicated generally at 22 is released by utilizing the key 23.

The structure of the box and the box lock mechanism and its relationship to the upper pedestal plate 18 to accomplish this purpose is explained subsequently.

The locking box includes end plates 24 and 25, face plates 26 and 27 and under plates 28 and 29. Except for the box lock mechanism and the upper pedestal plate 18 itself, the locking box 20 is symetrical about the central upright axis of the pedestal 12, so the relationship of the parts to end plate 24, face plate 26, and under plate 28 will be the same as the relationship of the same parts to the end plate 25, face plate 27 and under plate 29, so identical numerals can be used.

End plate 24 has firmly welded to it a first outwardly extending down tube retaining bar 30, and a second outwardly extending down tube retaining bar 32, situated in spaced apart parallel relationship to retaining bar 30. These retaining bars are fixedly mounted with respect to end plate 24 through the instrumentality of a rugged, heavy retaining bar anchor plate 34.

As perhaps best seen in FIG. 5, a J-shaped locking bar or J-bar 36 is slideably mounted in a J-bar locking mechanism 38 situated inside of the locking box 20 and extending through face plate 26. This J-bar locking mechanism 38 can be of any usual or preferred construction. For example, the mechanism shown in U. S. Pat. No. 3,394,790 will be excellent for the purpose. As shown in that patent, with the J-bar initially freely sliding with respect to the mechanism, a shorter end 48 thereof is captured in an opening 46 provided in retaining bar 30 and is slideable into a similar opening 46 provided in the retaining bar 32. A cotter key or other convenient preventer 52 is positioned on a longer end 50 of the J-bar to limit the movement of the bar away from retaining bar 30 in such a manner as to situate the end 48 in complete clearing relationship to the space between the retaining bars 30 and 32, but to prevent this bar end 48 from leaving opening 46 in retaining bar 30.

Figure 2:
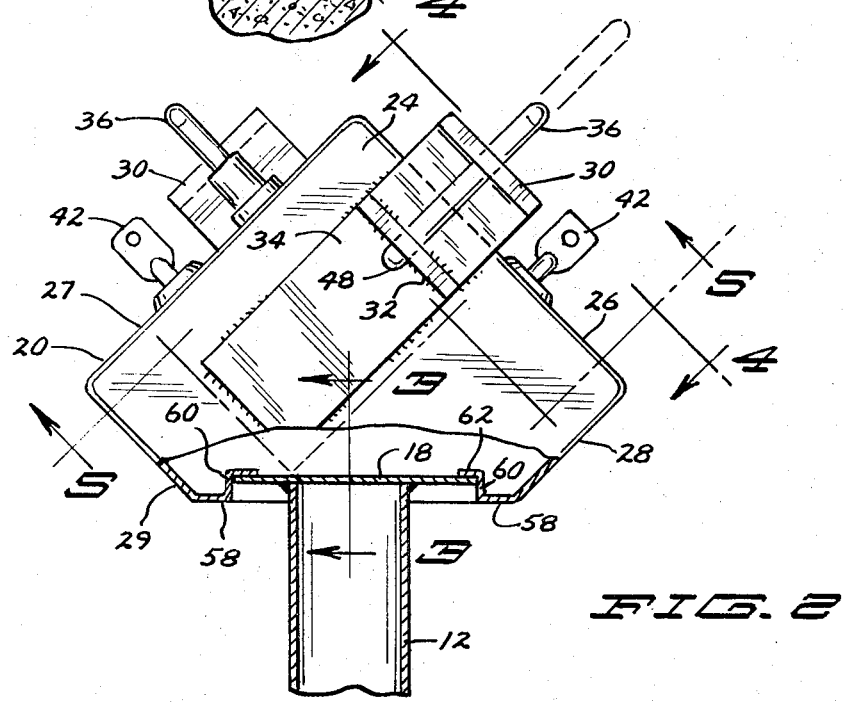
FIG. 2 is an enlarged elevational view of the upper portion of the locking stand of FIG. 1 as seen in that figure but with parts in section and parts broken away and without the bicycle pictured with respect thereto.

With the J-bar 36 situated as seen in dotted lines in FIG. 5, a bicycle down tube 54 is placed between locking bars 30 and 32 as seen in FIGS. 1, 4 and 5. As explained in the aforementioned patent, a coin will be inserted in coin slot 40, and then a key 42 will be operative to turn a key slot 44 from the key position as seen in FIG. 2 to the key slot position as seen in FIG. 44. With the part so positioned, locking mechanism 38 will allow the J-bar to be pushed toward and into closed condition, but will not allow the J-bar to be slid back out again. The key can then be withdrawn, and carried on the person of the cyclist until it is desired to lock the bicycle from the locking stand.

To release the bicycle, key 42 is again inserted in key slot 44 and turned, thus releasing the J-bar mechanism in the manner set out and described in the foregoing patent. J-bar 36 is then once again slideable with respect to the various mechanisms, is slid into clearing relation to the down tube 54, and the bicycle is removed.

As is explained in the patent, the key is then retained in the key slot until such time as a coin is again inserted in coin slot 42 to allow the key to be turned to again lock the J-bar in closed condition.

In order to retain the locking box 20 on the horizontal upper pedestal plate 18, box lock mechanism 22 is mounted in and extends through pedestal plate 18 and includes a locking tongue 56 which can be turned by key 23 to extend out toward the end plate 24 in locked position, as shown in FIG. 3, or to unlocked position where tongue 56 is at right angles to its position as seen in FIG. 3.

As best seen in FIG. 2, the bottom edge of each under plate 28 and 29 is provided with a horizontal portion 58, and integrally connected upstanding flange 60, and inwardly extending horizontal lip 62. Also as best seen in FIG. 2, the relationship between the flanges 60, the lips 62, and the end edges of the upper pedestal plate 18 are such that when the box is resting on the pedestal plate, someone trying to get the box off of the plate will find no opportunity to insert any kind of a pry or other instrument.

Referring now to FIG. 3, end plate 25 is provided with a J-shaped portion including a horizontal flange 64 extending inwardly from end plate 25, and upwardly extending lip 66 from the flange 64. The distance between the upper edge of the upwardly extending lip 66 and the bottom surface of the horizontally extending lips 62, 62 is just sufficient to accomodate the thickness of the pedestal plate 18, when the parts are positioned as seen in FIGS. 2 and 3.

End plate 24 also includes along its lower edge a horizontally extending flange, designated 68, and an upwardly extending lip designated 70, but this lip 70 goes up to be in alignment with the under wall lips 62, 62, the vertical extending lip 70 having a horizontal flange 72 extending inwardly toward the under wall lips 62, 62.

Thus with box lock mechanism 22 turned at right angles to the position as seen in FIG. 3, the locking box 20 will be tipped up so that the right end of the pedestal plate 18, as seen in FIG. 3, can be slid between the upstanding end plate lip 66 and the ends of the horizontal inwardly extending under wall lips 62, 62. The locking box 20 will then be lowered down until the horizontal flange 72 comes to rest on the end of the upper pedestal plate 18. Then key 23 is used to bring the locking tongue 56 around to the position as shown in FIG. 3, thus trapping the horizontal flange 72 between it and pedestal plate 18, and preventing all movement of the locking box with respect to the pedestal plate until such time as the key 23 is reinserted and the box lock mechanism is unlocked.

The embodiments of the invention in which an exclusive property or privilege is claimed are defined as follows:

1. A locking stand for a vehicle having at least two wheels and a main tubular frame, said stand including:

A. a locking box;
   B. means for fixedly positioning said box at a height to be adjacent a portion of said main frame when said vehicle is positioned adjacent said box and supported on its wheels;
   C. a vehicle locking mechanism inside said box;

D. a J-shaped locking bar having a first leg slideably mounted in said locking mechanism and through a wall of said box and a second leg spaced from and parallel to said first leg and extending outside said box;

E. a pair of parallel retaining bars integral with and extending outwardly of said box and positioned and spaced apart sufficiently far to encompass a portion of the main frame of the vehicle when the vehicle is in position adjacent the stand, each of said retaining bars being provided with an opening to snuggly receive said second leg of said J-Bar;

F. said J-Bar being movable between a closed condition wherein said second leg of said J-Bar is positioned in both of said retaining bar openings to retain a vehicle frame portion situated between said retaining bars, and an open position wherein said J-Bar is in clearing relation to the space between said retaining bars; and G. wherein said vehicle locking mechanism includes key actuated means for selectively locking said J-bar in said closed condition and releasing said J-bar for movement to said open condition.

2. The combination as specified in claim 1 wherein said vehicle is a bicycle and the locking box is positioned so that the retaining bars can encompass a portion of the down tube of the main frame of the bicycle.

3. The combination as specified in claim 2 wherein the J-bar, when in said open condition, is positioned so that the outer end of the second leg thereof is still in the provided opening in one of said retaining bars.

4. The combination as specified in claim 3 wherein said means for fixedly positioning said box includes a vertical pedestal permanently mounted with respect to the ground on which the locked vehicle is designed to stand; a horizontal upper pedestal plate integral with said pedestal; and means for fastening said locking box to said pedestal plate.

5. The combination as specified in claim 4 wherein said upper pedestal plate is rectangular, and wherein said means for fastening said box to said plate includes;

A. a box locking mechanism situated in adjacent relation to a first edge portion of the rectangular pedestal plate;

B. hook means constituted as an integral part of said locking box and positioned to extend down below a second edge portion of said plate parallel to and spaced opposite from said first plate edge portion;

C. plate contacting lips extending integrally inwardly from sides of said box in position to rest respectively on third and fourth parallel opposite spaced apart side edge portions of said plate at right angles to said first and second edge portions when said hook is in contact with the underside of said second edge portion of said plate;

D. said box locking mechanism being key actuated from the outside of said box and plate for movement between a locked position wherein said mechanism prevents upward movement of said box with respect to said first edge portion of said plate, and an unlocked position wherein said box can be raised with respect to said first edge portion of said plate, and can be slid to move said hook portion of said box in clearing relation to said second edge portion of said plate to the end that said box can be removed from said plate.

6. The combination as specified in claim 5 wherein said vehicle locking mechanism is coin activated in addition to being key activated, and wherein the coins, after activating said mechanism, drop into the inside of said box.

* * * * *